United States Patent [19]

Schexnayder et al.

[11] 4,365,473
[45] Dec. 28, 1982

[54] HYDROSTATIC TRANSMISSION HAVING AN OVERSPEED CONTROL

[75] Inventors: Lawrence F. Schexnayder; William J. Spivey, Jr., both of Joliet, Ill.

[73] Assignee: Caterpillar Tractor Co., Peoria, Ill.

[21] Appl. No.: 251,522

[22] PCT Filed: Aug. 20, 1980

[86] PCT No.: PCT/US80/01096
§ 371 Date: Aug. 20, 1980
§ 102(e) Date: Aug. 20, 1980

[87] PCT Pub. No.: WO82/00617
PCT Pub. Date: Mar. 4, 1982

[51] Int. Cl.³ .............................................. F15B 7/00
[52] U.S. Cl. ....................................... 60/447; 60/449
[58] Field of Search ................................. 60/447, 449

[56] References Cited

U.S. PATENT DOCUMENTS

| | | | |
|---|---|---|---|
| 3,293,932 | 12/1966 | Boydell et al. | 74/732 X |
| 3,526,288 | 9/1970 | Cryder et al. | 60/447 X |
| 3,543,508 | 12/1970 | Schwab | 60/449 |
| 3,952,514 | 4/1976 | Habiger | 60/447 X |
| 4,080,850 | 3/1978 | Bubula et al. | 74/731 X |
| 4,094,145 | 6/1978 | Habiger | 60/447 |
| 4,106,292 | 8/1978 | Habiger | 60/447 |

*Primary Examiner*—Gerald A. Michalsky
*Attorney, Agent, or Firm*—John W. Grant

[57] ABSTRACT

An underspeed actuator (18) is connected to the displacement control (17) for controlling the displacement of a variable displacement pump (11) of a hydrostatic transmission (10) in response to the pressure differential between low and high pressure control signals (A,B) wherein the pressure differential is directly proportional to the engine speed. An overspeed control valve means (41) is connected to the low and high pressure signals and decreases the pressure level of the high pressure signal received by the underspeed actuator (18) in response to the pressure differential exceeding a predetermined magnitude. This reduces the displacement of the variable displacement pump (11) thereby controlling the amount of engine overspeed caused by the hydrostatic transmission (10) driving the engine when the vehicle is descending a steep hill.

15 Claims, 3 Drawing Figures

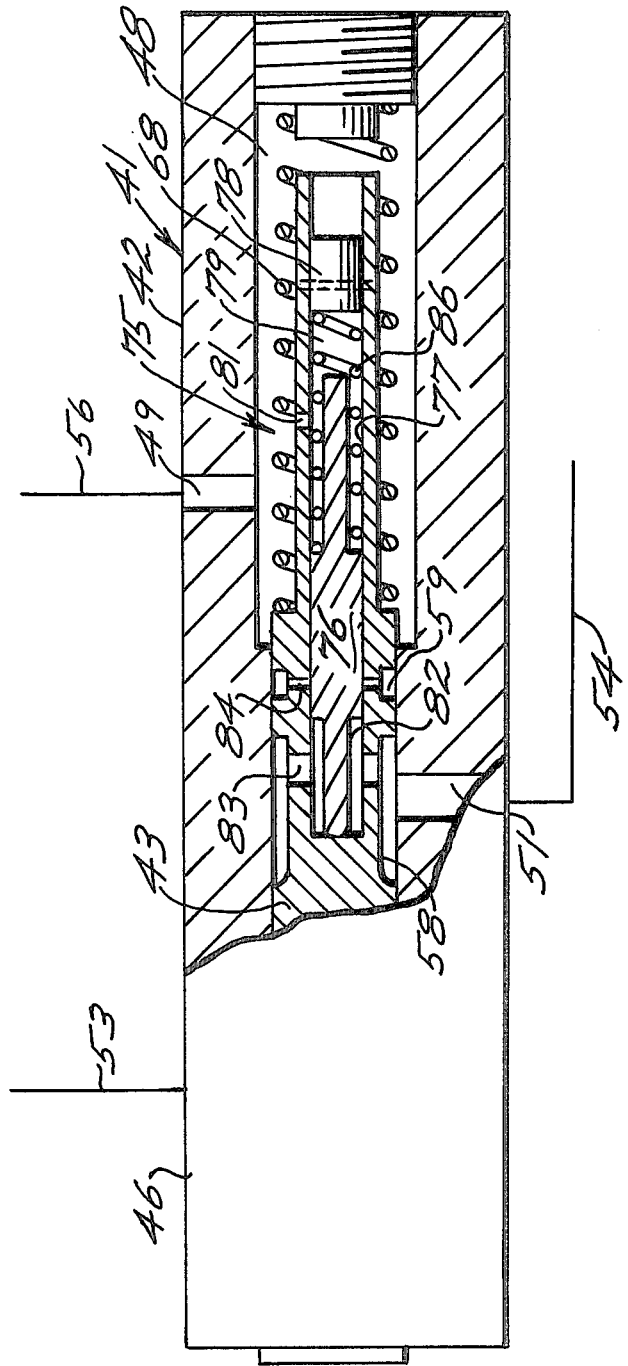

HYDROSTATIC TRANSMISSION HAVING AN OVERSPEED CONTROL

DESCRIPTION

1. Technical Field

This invention relates generally to a hydrostatic transmission for a vehicle and more particularly to an overspeed control for preventing the transmission from accelerating the engine and thus the components of the hydrostatic transmission to an overspeed condition when the vehicle is descending a steep hill.

2. Background Art

Some industrial vehicles have a hydrostatic transmission for delivering power from the engine to the wheels or tracks. Such a hydrostatic transmission commonly has a variable displacement pump and a fixed displacement drive motor, or in some cases a variable displacement motor, interconnected through a closed loop fluid circuit. When the vehicle having such a transmission is descending a hill, the drive motor tends to act as a hydraulic pump and directs pressurized fluid to the pump which acts as a hydraulic motor. The engine, being directly connected to the pump normally provides a braking or retarding action by resisting the driving action of the pump. However, when the vehicle is descending a steep hill the driving power generated by the transmission may be sufficient to cause the engine to overspeed under some conditions due to the reverse operation of the pump and drive motor. For example, with the pump in a maximum displacement condition it is in a condition for providing maximum torque when it acts as a motor and being driven by fluid directed thereto from the drive motor which is acting as a pump and being driven by the wheels or tracks. Thus, the torque generated by the pump under this condition over powers the engine and drives it at a speed commensurate with the fluid flow in the closed loop of the hydrostatic transmission. Such an overspeed condition of the engine could damage either the engine or the pump and drive motor since they are also being rotated faster than their designed operating speed.

The present invention is directed to overcoming one or more of the problems as set forth above.

DISCLOSURE OF THE INVENTION

In one aspect of the present invention a hydrostatic transmission has a variable displacement pump driven by an engine, signal means for controllably delivering low and high pressure signals with the pressure differential between the low and high pressure signals being increased in response to an increase in the engine speed and decreased in response to a decrease in the engine speed, and control means for receiving the low and high pressure signals and reducing the pump displacement in response to a decrease in the pressure differential below a predetermined magnitude. A valve means is provided for decreasing the pressure level of the high pressure signal received by the control means in response to the pressure differential between the low and high pressure signals exceeding a second predetermined magnitude.

Controlling the overspeed of an engine caused by the reverse operation of the pump and drive motor of a hydrostatic transmission of a vehicle descending a steep hill is accomplished by decreasing the pressure level of the high pressure signal received by the control means connected to the pump. Decreasing the pressure level of the high pressure signal causes the displacement of the pump to be reduced which in turn reduces the drive torque capability of the pump which is acting as a motor when the vehicle is descending a hill.

BRIEF DESCRIPTION OF THE DRAWINGS

FIG. 3 is a cross sectional view of an alternate valve construction.

BEST MODE FOR CARRYING OUT THE INVENTION

Figure 1:
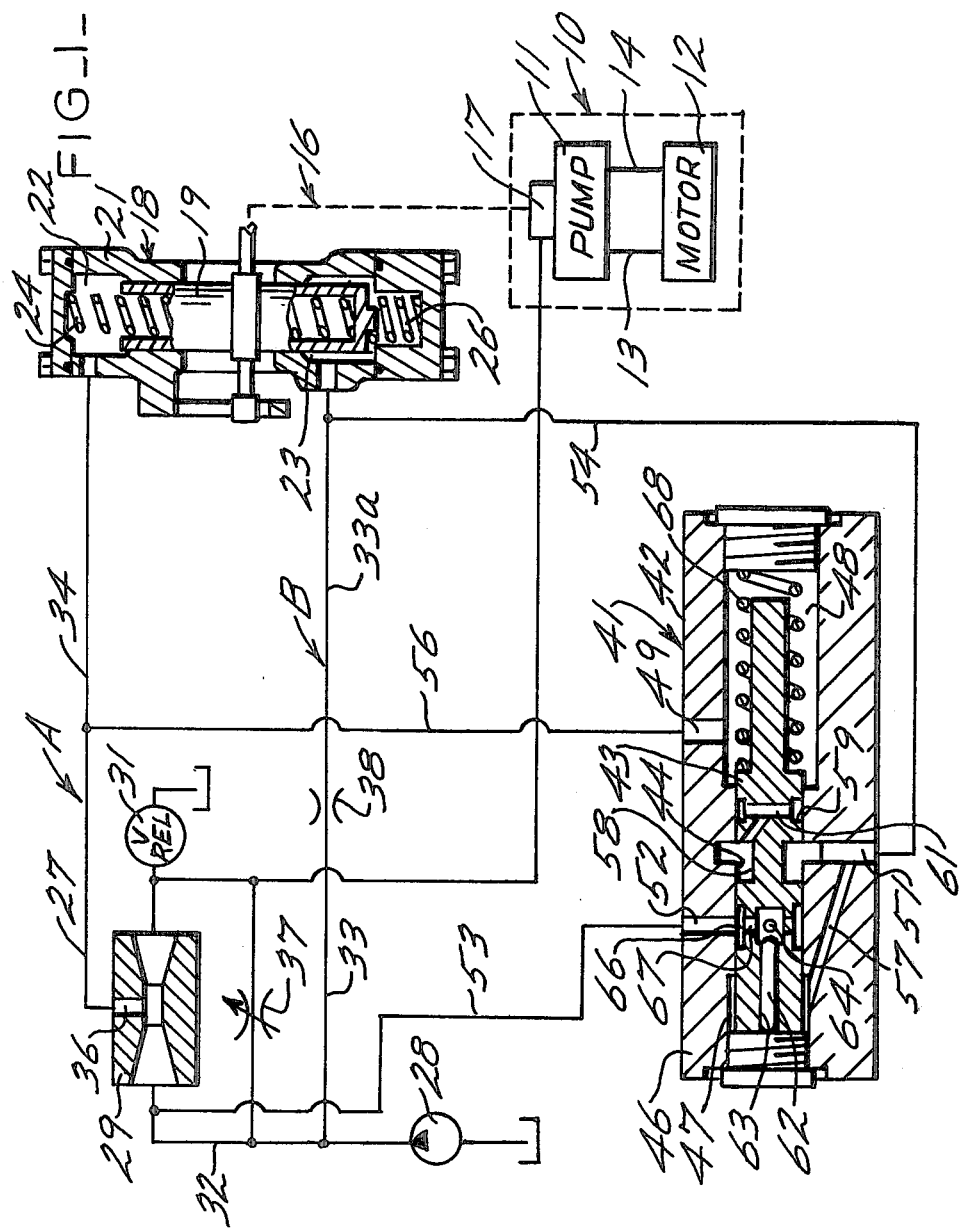
FIG. 1 is a schematic of an embodiment of the present invention with certain components shown in section.

Referring now to FIG. 1 hydrostatic transmission is generally indicated by reference numeral 10 and includes a variable displacement pump 11 and a fixed displacement drive motor 12 interconnected through a closed loop having first and second conduits 13,14. The variable displacement pump 11 is driven by an engine, not shown, while the drive motor 12 is connected to the drive wheels or tracks of the vehicle, not shown, in the usual manner.

A control means 16 is connected to the variable displacement pump 11 for controlling the displacement thereof and includes a displacement control 17 connected to the variable displacement pump 11 and an underspeed actuator 18 mechanically connected to the displacement control 17. The underspeed actuator 18 includes a piston 19 slidably positioned in a body 21 defining first and second fluid actuating chambers 22,23. First and second springs 24,26 are positioned within the first and second chambers 22,23 respectively at opposite ends of the piston 19.

For an understanding of the operation of the underspeed actuator 18 and its connection to the displacement control 17 it will suffice to state that the piston 19 is movable between a first position at which the displacement of the pump 11 is adjusted to its minimum displacement and a second position at which the displacement of the pump 11 is adjusted to its maximum displacement. As shown in the drawing the piston 19 is at its first position. The piston 19 is controllably moved between the first and second positions in response to pressure differential existing between the first and second chambers 22,23 as well as the force of the spring 24. The first and second positions of the piston 19 are commonly referred to as "full underspeed" and "zero underspeed", respectively.

A signal means 27 controllably delivers low and high pressure control signals A,B to the first and second actuating chambers 22,23 respectively at a pressure differential that is substantially proportional to the operating speed of the engine. The pressure differential between the low and high pressure signals A,B is increased in response to an increase in the engine speed and decreased in response to a decrease in the engine speed.

The signal means 27 can be, for example, a fixed displacement control pump 28, a venturi 29 and a relief valve 31. The control pump 28 is driven by the engine to produce fluid flow proportional to the operating speed of the engine. The venturi 29 is connected to the control pump 28 through a pump output line 32. A high pressure signal conduit 33 is connected to the pump output line 32 and to the second actuating chamber 23 for delivering the high pressure signal B thereto. A low pressure signal conduit 34 connects a low pressure port 36 to the first fluid actuating chamber 22 for delivering the low pressure signal A thereto.

A venturi bypass valve 37 is positioned in parallel to the venturi 29 for fine tuning the signal means 27 for providing a predetermined pressure differential between the low and high pressure signals A,B at a preselected engine speed.

A restriction means for example, an orifice 38 is positioned within high pressure signal conduit 33 for restricting fluid flow thereto for a later defined purpose.

An overspeed control valve means 41 is connected to the signal means 27 for decreasing the pressure level of the high pressure signal B received by the control means 16 in response to the pressure differential between the low and the high pressure signals A,B, exceeding a predetermined magnitude. The valve means 41 includes a pressure reducing type valve 42 having a valve spool 43 slidably positioned in a bore 44 of a valve body 46 defining a pair of fluid chambers 47,48 at opposite ends of the valve spool 43. A first port 49 communicates with the chamber 48 while second and third axially spaced ports 51,52 communicate with the bore 44. The third port 52 is connected to the pump output line 32 through a conduit 53. The second port 51 is connected through a conduit 54 to a portion 33a of high pressure signal conduit 33 between the orifice 38 and the underspeed actuator 18. The first port 49 is connected to the low pressure signal conduit 34 through a conduit 56. A passage 57 connects the second port 51 to the fluid chamber 47.

The valve spool 43 has a first annular groove 58 in continuous communication with the second port 51 and a second annular groove 59 axially spaced from the first annular groove and connected thereby by a passage 61. A piston 62 is slidably positioned in a bore 63 at one end of the valve spool 43 and in communication with the fluid chamber 47 defining a chamber 64. An annular groove 66 in the valve spool is in continuous communication with the third port 52 and with the fluid chamber 64 through a plurality of radial passages 67.

The valve spool 43 is movable between a first position at which the portion 33a of high pressure signal conduit 33 is blocked from communication with the fluid chamber 48 and hence the low pressure signal conduit 34 and a second position at which the portion 33a of the high pressure signal conduit 33 is in variable communication with the fluid chamber 48 and hence the low pressure signal conduit 34. A spring 68 is positioned in the fluid chamber 48 for resiliently urging the valve spool 43 to the first position.

Alternately, the first port 49 can be connected to the reservoir so that the portion 33a of the high pressure signal conduit 33 is in variable communication with the reservoir at the second position of the valve spool 43.

OPERATION OF THE FIRST EMBODIMENT

Under normal operating conditions the underspeed actuator 18 functions to control the displacement of the variable displacement pump 11 in response to variations in engine speed caused by varying lug conditions on the engine. Thus, when the engine is lightly loaded and operating at a maximum predetermined operating speed, the signal means 27 produces a pressure differential between the low and high pressure signals A,B sufficient for the high pressure signal B in the fluid chamber 23 to urge the piston 19 upwardly to its second position at which the variable displacement pump 11 is at its maximum displacement. However, in a lug condition sufficient to cause the engine speed to drop, the output flow of control pump 28 also decreases so that the pressure differential between the low and high pressure signals A,B also decreases. When the pressure differential drops below a first predetermined magnitude the piston 19 moves downwardly toward its first position thereby reducing the displacement of the variable displacement pump 11.

During the above noted normal operating condition the pressure differential between the low and high pressure signals A,B is felt at three areas of the valve 42. The high pressure signal B in the high pressure conduit 33 is delivered to the fluid chamber 64 where it acts directly on the piston 62. The high pressure signal B in portion 33a downstream of the orifice 38 is delivered to the fluid chamber 47 where it acts on the end of the valve spool 43 minus the area of the piston 63. The low pressure signal A in low pressure signal conduit 34 is delivered to the fluid chamber 48. However, the bias of the spring 68 resiliently prevents movement of the spool 43 to its second position so long as the engine speed remains within its normal operating range. Should the engine speed exceed the normal operating range such as might occur when the vehicle is descending a steep hill with the pump 11 at its maximum displacement, the pressure differential between the low and high pressure signals A,B, increases. When the pressure differential exceeds a second predetermined magnitude, the valve spool 43 will move to the second position causing variable communication between conduits 54 and 56 and hence between portion 33a of high pressure signal conduit 33 and low pressure signal conduit 34. The orifice 38 establishes a pressure drop in the portion 33a of high pressure signal conduit 33 and hence second chamber 23 thereby causing the piston 19 to move toward its second position and reduces the displacement of the variable displacement pump 11. Reducing the displacement of the variable displacement pump 11 (which is acting as a motor in a downhill situation) reduces its output torque capability and thereby controls the amount of engine overspeed.

The piston 62 is sized so that the decrease in pressure of the high pressure signal B in portion 33a is proportional to the increase in the pressure differential between the low and high pressure signals A,B generated by the signal means 27.

After the vehicle reaches the bottom of the hill or other procedures taken to slow the engine speed to its normal operating range the signal means 27 automatically decreases the pressure differential between the low and high pressure signals A,B. This causes the valve spool 43 to move back to its first position blocking communication between conduits 54 and 56 so that the underspeed actuator 18 is again under the direct control of the signal means 27.

SECOND EMBODIMENT

Figure 2:
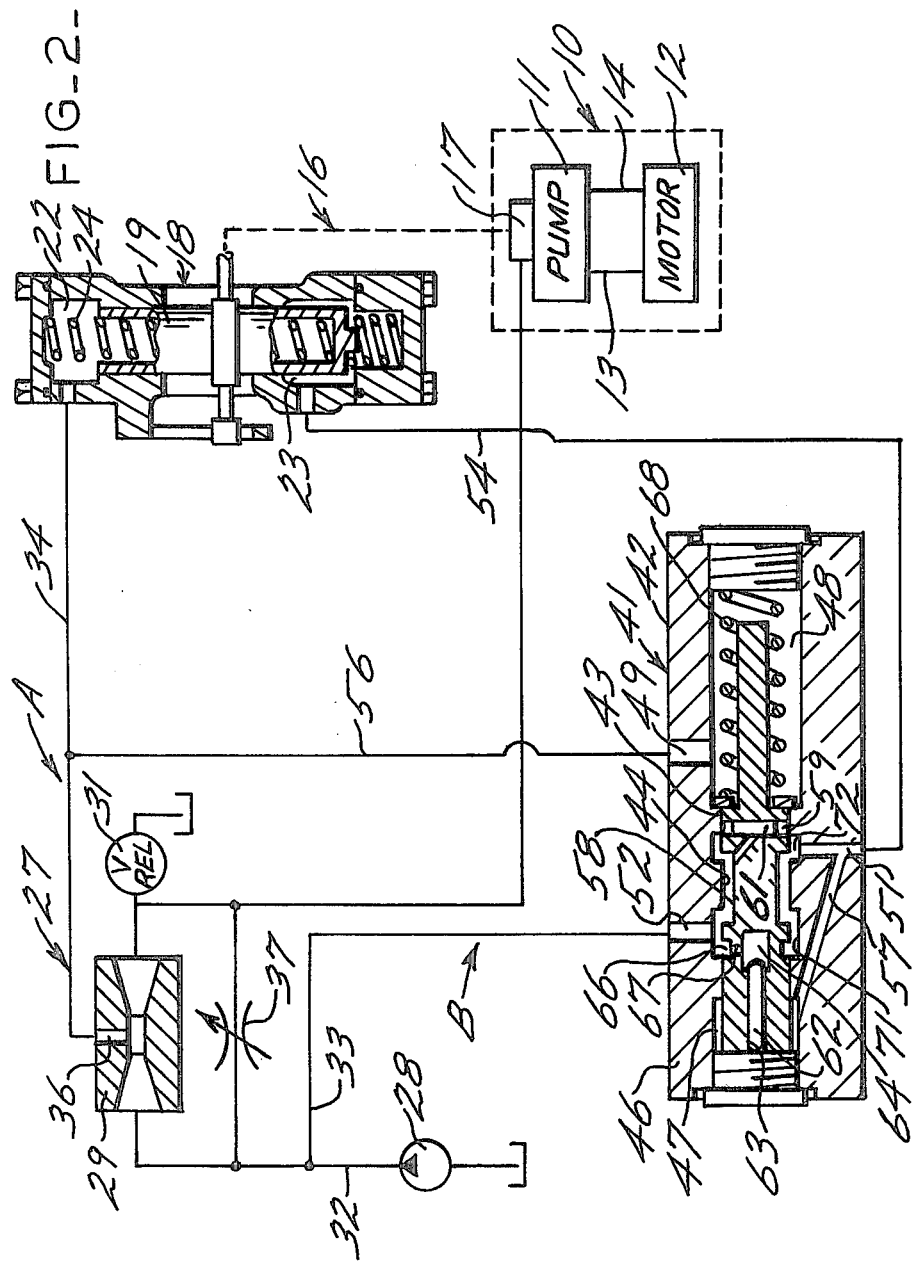
FIG. 2 is a schematic of a second embodiment of the present invention.

A second embodiment of a hydrostatic transmission having an overspeed control is disclosed in FIG. 2. It is noted that the same reference numerals of the first embodiment are used to designate similarly constructed counterpart elements of this embodiment. In this embodiment, however, the valve body 46 of valve 41 has a pair of axially spaced annuluses 71,72. The high pressure signal conduit 33 is connected directly to the third port 52 which in turn is in communication with the annulus 71. The second port 51 is in communication with the annulus 72 and is connected to the conduit 54 which is in turn in direct communication with the second chamber 23 of the underspeed actuator 18. The valve spool 43 is movable between a first position at which the high pressure signal conduit 33 is in communication with the conduit 54 and is blocked from communication with the low pressure signal conduit 34 and a second position at which communication between the high pressure signal conduit 33 and the conduit 54 and between the conduit 54 and the low pressure conduit 34 is controllably modulated.

OPERATION OF THE SECOND EMBODIMENT

The operation of the second embodiment is essentially as described above with the difference being that instead of the valve 41 reducing the pressure in a portion of the high pressure signal conduit 33 and hence the second fluid chamber 23, the high pressure signal B is normally delivered from the signal means 27 to the second fluid chamber 23 through the valve 41 at the first position of the valve spool 43. Thus at the second position of the valve spool 43 delivery of the high pressure signal B to the second fluid chamber 23 and communication between the second fluid chamber 23 and the low pressure signal conduit 34 is controllably modulated to reduce the fluid pressure in the second fluid chamber 23.

THIRD EMBODIMENT

A third embodiment of a hydrostatic drive having overspeed control is disclosed in FIG. 3. It is noted that the same reference numerals of the first embodiment are used to designate similarly constructed counterpart elements of this embodiment. In this embodiment, however, a limiting means 75 is included as part of the valve means 41 for limiting the extent of decrease in the pressure level of the high pressure signal B received by the control means 16 in response to the pressure differential between the low and high pressure signals exceeding a third predetermined magnitude greater than the second predetermined magnitude. The limiting means 75 can include, for example, another valve spool 76 slidably positioned in a bore 77 in the end of the valve spool 43 extending into the fluid chamber 48. A plug 78 is sealingly secured within the bore defining a fluid chamber 79 at one end of the valve spool 76 with the fluid chamber 79 being a fluid communication with the fluid chamber 48 through a passage 81. Another fluid chamber 82 at the other end of the valve spool 76 is in communication with the annular groove 58 of the spool 43 through a pair of radial passages 83, a pair of radial passages 84 connect the bore 77 and the annular groove 59. The valve spool 76 is movable between a first position at which the passages 83 are blocked from communication with radial passages 84, a second position at which the passages 83 are in fluid communication with radial passages 84 and has an intermediate position at which communication between the passages 83 and the radial passages 84 is controllably modulated. A spring 86 is positioned in the chamber 79 and resiliently urges the valve spool 76 to the first position.

OPERATION OF THE THIRD EMBODIMENT

The basic operation of the valve means 41 of this embodiment is essentially the same as the operation of the first embodiment and therefore, only the operation of the limiting means 75 will be described in detail. During normal operation of the hydrostatic transmission 10 the high pressure signal B is delivered through conduit 54, the second port 51, annular groove 58, and passages 83 into the fluid chamber 82. Also, the low pressure signal A is delivered through conduit 56, first port 49, fluid chamber 48, passage 81, and into the fluid chamber 79. When the engine speed reaches the maximum operating speed the fluid pressure in fluid chamber 82 will be sufficient to move the valve spool 76 rightwardly to the second position against the resiliency of the spring 86. This establishes communication between the annular grooves 58 and 59 through the passages 83, bore 77 and passages 84.

As the valve spool 43 moves rightwardly to its second position in response to an increase in the pressure differential in the low and high pressure signals A,B, in response to an increase in engine speed above the maximum operating speed, the high pressure signal B is communicated with the low pressure signal A to controllably decrease the fluid pressure in the annular groove 58, the conduit 54, and hence the second fluid chamber 23 of the underspeed actuator 18. As the fluid pressure in the annular groove 58 continues to decrease as the engine speed increases, the fluid pressure in the fluid chamber 82 also decreases resulting in movement of valve spool 76 to the left toward its intermediate position. When the fluid pressure in the annular groove 58 has decreased to a predetermined level, the valve spool 76 will have reached its intermediate position and will thereafter maintain the pressure in the annular groove 58, conduit 54 and the second fluid chamber 23 at the predetermined level. This predetermined level is preferably selected so that the displacement of the variable displacement pump 11 is reduced to an intermediate displacement between the maximum and minimum displacement of the pump.

INDUSTRIAL APPLICABILITY

The present invention has particular utility on all vehicles having a hydrostatic transmission as a control for preventing the transmission from accelerating the engine and the components of the transmission to an overspeed condition when the vehicle is descending a hill. The overspeed control operates automatically without operator input and functions by reducing the displacement of the variable displacement pump thereby reducing its drive torque capability when the pump is acting as a motor in a downhill condition. By reducing the drive torque capability of the pump, its ability to drive the engine is reduced thereby limiting the degree of engine overspeed.

Other aspects, objects and advantages of this invention can be obtained from a study of the drawings, the disclosure and the appended claims.

What is claimed is:

1. In a hydrostatic transmission (10) having a variable displacement pump (11) driven by an engine, signal means (27) for controllably delivering low and high pressure signals (A,B) with the pressure differential between the low and high pressure signals being increased in response to an increase in the engine speed and decreased in response to a decrease in the engine speed, and control means (16) for receiving the low and high pressure signals and reducing the pump displacement in response to said pressure differential between the low and high pressure signals dropping below a predetermined magnitude, the improvement comprising:

overspeed control valve means (41) for decreasing the pressure level of the high pressure signal (B) received by the control means (16) in response to the pressure differential between the low and high pressure signals (A,B) exceeding a second predetermined magnitude.

2. The apparatus as set forth in claim 1, wherein said overspeed control valve means (41) includes a valve (42) in communication with the low and high pressure signals (A,B) and being movable between a first portion at which the high pressure signal (B) is blocked from communication with the low pressure signal (A) and a second position at which the high pressure signal (B) is in variable communication with the low pressure signal (A).

3. The hydrostatic transmission, as set forth in claim 2, wherein said valve (42) is moved from the first position to the second position in response to the pressure differential between the low and high pressure signals (A,B) exceeding the second predetermined magnitude and is moved to the first position in response to the pressure differential between the low and high pressure signals being below said second predetermined magnitude.

4. The hydrostatic transmission, as set forth in claim 3, wherein said valve (42) includes means for controlling the decreasing pressure level of the high pressure signal (B) received by the control means (16) at a rate proportional to the increase in said pressure differential.

5. The hydrostatic transmission, as set forth in claim 1, wherein said valve means (41) includes a valve (42) having a first port (49) in fluid communication with the low pressure signal (A), a second port (51) in fluid communication with the high pressure signal (B) received by the control means (16), and a valve spool (43) movable between a first position at which the second port (51) is blocked from communication with the first port (49) and a second position at which the second port (51) is in variable communication with the first port (49).

6. The hydrostatic transmission, as set forth in claim 5, wherein said valve (42) has a fluid chamber (48) at one end of the valve spool (43) in communication with the first port (49), a spring (68) positioned in the chamber (48) and adapted to urge the valve spool (43) toward the first position, a second chamber (47) at the opposite end of the valve spool (43), a passage (57) connecting the second port (51) and the second chamber (47), a bore in the second end of the valve spool (43) and opening into the second chamber (47), a piston slidably positioned in the bore (63) defining a third chamber (64), a third port (52) adapted to receive the high pressure signal (B) from the signal means (27) and a radial passage (67) communicating the third port (52) and the third chamber (64).

7. The hydrostatic transmission, as set forth in claim 5, including means (38) for restricting delivery of the high pressure signal (B) from the signal means (27) to the control means (16) and establishing a pressure drop in the high pressure signal (B) delivered to the control means (16) in response to the valve spool (43) being moved to the second position.

8. The hydrostatic transmission, as set forth in claim 7 wherein said valve (42) has a third port (52) in communication with the high pressure signal (B) upstream of the restricting means (38), a fluid chamber (48) at one end of the valve spool (43) and in communication with the first port (49), a spring (68) positioned in the chamber (48) and adapted to urge the valve spool (43) toward the first position, a second chamber (47) at the opposite end of the valve spool (43), a passage (57) connecting the second port (51) and the second chamber (47), a bore (63) in the second end of the valve spool (43) and opening into the second chamber (47), a piston (62) slidably positioned in the bore (63) defining a third chamber (64), and a passage (67) communicating the third port (52) and the third chamber (64).

9. The hydrostatic transmission, as set forth in claim 8 wherein said control means (16) includes a pump displacement control means (17) for adjusting the displacement of the variable displacement pump (11) in response to a mechanical input, and an underspeed actuator (18) mechanically connected to the pump displacement control means (17) and having a first chamber (22) adapted to receive the low pressure signal (A) and a second chamber adapted to receive the high pressure signal (B), said underspeed actuator being adapted to alter the mechanical input to the pump displacement control means (17) in response to changes in the pressure differential between the low and high pressure signals (A,B).

10. The hydrostatic transmission (10) as set forth in claim 5, including limiting means (75) for limiting the extent of decrease in the pressure level of the high pressure signal (B) received by the control means (16) in response to the pressure differential between the low and high pressure signals (A,B) exceeding a third predetermined magnitude.

11. The hydrostatic transmission as set forth in claim 10 wherein said limiting means (75) includes a bore (77) in the valve spool (43), a passage (83) continuously communicating the bore (77) with the second port (51), passage means (84,59) for communicating the bore (77) and the first port (49) at the second position of the valve spool (43), a second valve spool (76) slidably positioned in the bore (77) and movable between a first position at which the passage (83) is blocked from communication with the passage means (84,59), a second position at which the passage (83) is in communication with the passage means (84,59), and an intermediate position at which communication between the passage (83) and the passage means (84,59) is controllably modulated.

12. The hydrostatic transmission, as set forth in claim 10, including a spring (86) positioned in the bore (77) in the valve spool (43) and adapted to resiliently move the second valve spool (76) to the first position.

13. The hydrostatic transmission, as set forth in claim 1 wherein said control means (16) includes a pump displacement control means (17) for adjusting the displacement of the variable displacement pump (11) in response to a mechanical input, and an underspeed actuator (18) mechanically connected to the pump displacement control means (17) and having a first chamber (22) adapted to receive the low pressure signal (A) and a second chamber adapted to receive the high pressure signal (B), said underspeed actuator being adapted to alter the mechanical input to the pump displacement control means (17) in response to changes in the pressure differential between the low and high pressure signals (A,B).

14. The hydrostatic transmission as set forth in claim 1, wherein said overspeed control valve means (41) includes a valve (42) having a first port (49) in communication with the low pressure signal (A), a second port (51) in communication with the control means, a third port (52) in communication with the high pressure signal (B), a valve spool (43) movable between a first position at which the second port (51) is in communication with the third port (52) and is blocked from communication with the first port (49) and a second position at which communication between the third port (52) and the second port (54) and between the second port (54) and the first port (49) is controllably modulated.

15. The hydrostatic transmission as set forth in claim 14, wherein said valve (42) has a fluid chamber (48) at one end of the valve spool (43) in communication with the first port (49), a spring (68) positioned in the chamber (48) and adapted to urge the valve spool (43) toward the first position, a second chamber (47) at the opposite end of the spool (43), a passage (57) connecting the second port (51) and the second chamber (47), a bore (63) in the second end of the valve spool (43) and opening into the second chamber (47), a piston (62) slidably positioned in the bore (63) defining a third chamber (64), and a passage (67) communicating the third port (52) and the third chamber (64).

* * * * *